United States Patent [19]

Ueta

[11] Patent Number: 5,544,899
[45] Date of Patent: Aug. 13, 1996

[54] METALLIC GASKET

[75] Inventor: Kosaku Ueta, Kumagaya, Japan

[73] Assignee: Japan Metal Gasket Co., Ltd., Japan

[21] Appl. No.: 160,398

[22] Filed: Dec. 1, 1993

[30] Foreign Application Priority Data

Jan. 14, 1993 [JP] Japan .................. 5-021877
Jul. 15, 1993 [JP] Japan .................. 5-175401

[51] Int. Cl.⁶ ............................................. F16J 15/08
[52] U.S. Cl. ................................................ 277/235 B
[58] Field of Search ............................. 277/232, 234, 277/235 B, 236

[56] References Cited

U.S. PATENT DOCUMENTS

| | | | |
|---|---|---|---|
| 4,721,315 | 1/1988 | Ueta | 277/235 B |
| 4,815,750 | 3/1989 | Yoshino | 277/235 B |
| 4,896,891 | 1/1990 | Udagawa | 277/235 B |
| 5,092,613 | 3/1992 | Udagawa | 277/235 B |
| 5,286,039 | 2/1994 | Kawaguchi et al. | 277/235 B |
| 5,294,135 | 3/1994 | Kobouchi et al. | 277/235 B |

FOREIGN PATENT DOCUMENTS

| | | | |
|---|---|---|---|
| 0468526 | 1/1992 | European Pat. Off. | |
| 574166 | 12/1993 | European Pat. Off. | 277/235 B |
| 83842 | 3/1989 | Japan | 277/235 B |
| 320626 | 3/1991 | Japan | |
| 4347065 | 12/1992 | Japan | 77/235 B |
| 356277 | 1/1993 | Japan | |
| 5001772 | 1/1993 | Japan | 277/235 B |
| 5118443 | 5/1993 | Japan | 277/235 B |
| 6050432 | 2/1994 | Japan | 277/235 B |

*Primary Examiner*—Thomas B. Will
*Assistant Examiner*—John L. Beres
*Attorney, Agent, or Firm*—Young & Basile, P.C.

[57] ABSTRACT

A metallic gasket includes two elastic metal base plates and a thinner subplate disposed between the inner sides of the base plates, wherein at least two cylinder bore holes are perforated in each of the base plates and subplate, a bead protrudes outward from each base plate at the periphery of each cylinder bore hole by way of a flat area, and a linear bead joining the beads for both of the adjacent cylinder bore holes is formed between the adjacent cylinder bore holes. The subplate includes an essentially circular circumferential edge portion present only at the periphery of each of the cylinder bore holes and a continuous portion between adjacent cylinder bore holes. The subplate is secured to the circumference at the inner side of one of the base plates at a portion of the flat area of the base plate near the cylinder bore hole, the outer circumferential end at the peripheral edge of the subplate is varied within the bead width of the base plate and a linear bead that can be contained within the linear base plate bead is formed only in the continuous portion of the subplate.

1 Claim, 7 Drawing Sheets

METALLIC GASKET

BACKGROUND OF THE INVENTION

1. Field of the Invention

The present invention concerns a metallic gasket disposed between the joining faces of a cylinder block and a cylinder head, that constitute an internal combustion engine to prevent combustion gas, cooling water, lubricant or the like from leaking therebetween.

2. Description of the Prior Art

In an internal combustion engine, generally referred to as an engine, a gasket is interposed between the joining faces of a cylinder block and a cylinder head which are tightened by a clamping means, such as bolts, to provide a seal therebetween.

In the gasket seal, a seal at the periphery of a combustion chamber, that is, a cylinder bore is particularly important and, if the seal is defective at that portion, the combustion gas in the combustion chamber can not be utilized effectively and results in a lower gas pressure.

Therefore, in an elastic base plate of a metallic gasket, a bead is formed concentrically with a cylinder bore hole and formed parallel to the cylinder bore, so that the surface pressure generated by the previously mentioned bolts between the joining faces of the metallic gasket and the cylinder block or the cylinder head (also referred to as engine parts, respectively) improves the seal at the periphery of the cylinder bore by utilizing the reaction force of the bead that results when the metallic gasket is tightened between the cylinder block and the cylinder head.

In this way, a flat area like other portions of the base plate is formed between the cylinder bore hole and the bead formed at the periphery of the cylinder bore hole. The bead is formed to adjust and compensate for a positional deviation between the punching press used to form the cylinder bore hole and the molding press used to form the bead. However, when the cylinder block and the cylinder head are tightened with the metallic gasket being interposed therebetween, a high surface pressure is generated due to the reaction force of the bead in the vicinity thereof, whereas portions of the cylinder block or the cylinder head in contact with the bead at a position near the cylinder bore hole, namely, portions opposing or in contact with the flat area, deform so as to be separated from each other.

Because of such separating deformation, although a surface pressure can be ensured in the flat area between each of the joining faces of the cylinder block or the cylinder head and the metallic gasket, the tightening force of the cylinder block and the cylinder head to the metallic gasket is lowered and at some time results in a gap between such components. When the engine is operated in such a state, vibration occurs in the metallic gasket from the flat area on which the tightening force is reduced and proceeds to the bead. At the same time, the tightening force to the metallic gasket varies together with the increase or decrease of the cylinder bore pressure during the engine combustion process to induce vibration of the bead. Also, the tightening force to the metallic gasket also varies due to the vibration of the mass or volume change in each of the engine parts caused by their temperature change, so that the vibration or the change of the tightening force may possibly cause fatigue failure, particularly in a portion of the bead which is restricted in movement.

In view of this, it has been proposed, for example, as described in Japanese Utility Model Application Hei 3-56277, to reduce vibration amplitude from a flat area to a bead by securing a shim plate (subplate) to the flat area. In this proposed metallic gasket, as shown in FIG. 12, beads 32 formed on two base plates 30, 31 are inwardly opposed to each other, and a subplate 36 having such a thickness to reduce a gap at a flat area 35 between bead 32 formed on each of the base plates 30, 31 and a cylinder bore hole 33 is disposed at the flat area 35 of one of the base plates (lower base plate 31 in FIG. 12) at the periphery of the cylinder bore hole 33 and the whole periphery is secured, for example, by welding while aligning both cylinder bore holes 33 and 34.

In FIG. 12, reference number 37 denotes a securing line. This suppresses the vibration amplitude starting from the flat area 35 to the bead 32. A reaction force is also generated in the flat area 35 by way of the subplate 36 by increasing the thickness of the subplate 36 so that the tightening force exerted on the bead 36 is dispersed in order to suppress the vibration or fluctuation of the tightening force caused by the increase or the decrease of the cylinder bore pressure generated in the combustion process or by the volume change due to temperature change of the engine parts, thereby suppressing the fatigue failure of the bead 32.

In a case where two or more cylinder bore holes are formed and the distance between adjacent cylinder bore holes decreases, the beads overlap between the adjacent cylinder bore holes. In such a case, it is proposed to join the beads between the cylinder bore holes into a linear configuration and extend it perpendicularly to a line connecting the centers of the adjacent cylinder bore holes (refer to U.S. Pat. No. 4,815,750). This also ensures surface pressure between the cylinder bore holes to which the tightening force of the clamping means, such as bolts, is difficult to apply.

However, with the demand for the engine size reduction along with recent remarkable technical innovations, the distance between the combustion chambers has been reduced and the cylinder bore diameter has been increased so that the distance between the cylinder bores has been greatly decreased. In addition, with the demand for weight reduction, power increase and fuel economy of an engine, use of aluminum material for the engine parts has been developed, auxiliary equipment, such as a super charger, has been attached and the gas mixture has become more lean. With a combination of such factors, the amplitude of vibration generated in the metallic gasket has a tendency to increase.

In addition, as the use of aluminum material for the engine parts has progressed, rigidity of the materials is lowered. Further, although increase of heat capacity of the material caused by the size and weight reduction is coped with, for example, by enlarging the cooling water channel, this reduces engine rigidity even more. In addition, since the cooling water channel is located closer to the cylinder bore, the tightening position by the clamping means, such as the bolts, is removed further from the cylinder bore, and the tendency toward less tightening force of the metallic gasket becomes conspicuous at a position between the cylinder bores.

Taking these various factors into consideration, there is a big difference between the tightening force on the metallic gasket near the clamping means, such as bolts, and the tightening force on a position away from the clamping means, specifically, between the bolts. If the tightening force differs greatly as described above, gap variance is caused around the cylinder bore between the base plates of the metallic gasket or between the base plate and the cylinder block or the cylinder head. If the subplate disposed at the periphery of the cylinder bore hole between the base plates of the metallic gasket is made uniform with respect to the width and the thickness, deformation of the engine parts, such as the cylinder block or the cylinder head, at the periphery of the cylinder bore lose uniformity and, as a result, the cylinder bore circularity is degraded so as to reduce combustion efficiency, increase friction loss, combustion pressure fluctuation and degradation of durability.

The problem is noteworthy, particularly, between the cylinder bores, because there is a limit for the subplate width owing to the narrow space between the cylinder bores, and the difficulty in controlling the reaction force of the metallic gasket between the cylinder bore holes.

SUMMARY OF THE INVENTION

This invention has been developed in view of the forgoing problems and it is an object thereof to provide a metallic gasket capable of coping with the high performance of an engine.

To overcome the foregoing problems, the present inventor has made an earnest study and accomplished the present invention based on the following findings.

The gap formed around the cylinder bore can be made uniform by the subplate, thereby making the tightening force or the surface pressure in the area uniform by varying the width of the subplate and adjusting the engine deformation. In this case, if beads formed in two base plates are inwardly opposed to each other, as shown in FIG. 12, the width of the subplate is limited by the width of the flat area between each of the beads and the cylinder bore holes. This disadvantage can be avoided by forming beads on the two base plates outwardly from each of the base plates and by varying the width of the subplate within the concave range of the bead.

As is well-known, if a tightening force collapses a bead having a hill-like lateral cross section, buckling occurs at the middle of the hill-like bead and the bead deforms such that the number of hills is increased from one to two, four, etc., and the surface pressure is higher at the crests in contact with the engine parts and is gradually lower in the valley therebetween. If the width of the subplate is varied within the concave range of the bead as described above, the number of hills of the bead corresponding to the width of the subplate is increased or decreased in accordance with the deformation in which the reaction force of the bead is increased as the number of the hills of the bead corresponding to the subplate is increased, that is, as the width of the subplate is made greater, whereas the reaction force of the bead is decreased as the number of the hills of the bead corresponding to the subplate is decreased, that is, as the width of the subplate is made smaller.

On the other hand, it is very difficult to control the reaction force between the cylinder bore holes because there is a limited width for the subplate. However, if the thickness is adjusted, for example, by staking the subplates, the cylinder circularity degrades. Then, the subplates are made continuous in a portion between adjacent cylinder bore holes and the reaction force of the metallic gasket is controlled by the bead formed in the continuous portion. As described above, the base plate bead is made linear at a narrow area between cylinder bore holes. In this case, when both lateral ends of the continuous portion near the bore holes are secured to a flat area near the adjacent cylinder bore holes, if the continuous portion is left flat as it is, the force regulating the deformation of the bead becomes too large so that the reaction force of the metallic gasket in that portion becomes excessively large and the non-circularity of the cylinder bore becomes inordinately high.

On the other hand, if the force regulating the deformation of the bead is small, insufficient surface pressure results between the cylinder bore holes in which the tightening force by the clamping means, such as bolts, is at a minimum as described above, and the seal deteriorates. It has been found that the force regulating the deformation of the base plate bead, that is, the reaction force of the metallic gasket in that portion can be controlled by forming a linear bead that is contained in the linear bead of the base plate in the continuous portion of the subplate and, further, by controlling the height of the bead. Further, when the buckling strength to the tightening force is changed by varying the bead width as usual, specifically, by narrowing the width of the bead, since the buckling strength is improved, the reaction force of the metallic gasket in that portion is increased, whereas the reaction force of the metallic gasket is reduced in that portion by increasing the bead width since the buckling strength is reduced.

The above-mentioned phenomena are appropriately combined and utilized to adequately increase the surface pressure at the periphery of the cylinder bore and making it uniform around the cylinder bore, thereby ensuring the circularity of the cylinder bore and improving the seal around the cylinder bore.

In the first aspect of the present invention, there is provided a metallic gasket having a laminate structure comprising two elastic base plates made of metal material and stacked on each other and a subplate having a thickness thinner than the base plate and disposed between the inner sides of the base plates, wherein at least two cylinder bore holes are perforated in each of the base plates and the subplate in the laminated state, a bead protrudes outwardly from the outer side of each of the base plates at the periphery of each cylinder bore hole in each of the base plates by way of and along the outer circumference of a flat area, a linear bead which joins the beads for both of the adjacent cylinder bore holes and extends perpendicularly to a line connecting the centers of both of the cylinder bore holes is formed between the adjacent cylinder bore holes in each of the base plates, the subplate comprises an essentially circular circumferential edge existing only at the periphery of each of the cylinder bore holes and a continuous portion to make a portion of the subplate continuous with the adjacent cylinder bore hole, the subplate is secured over the entire circumference to the inner side of one of the base plates at the flat area of the base plate near the cylinder bore hole, with the inner circumferential edge of the cylinder bore hole in the subplate being aligned with the inner circumferential edge of the cylinder bore hole in the base plate, the outer circumferential end at a peripheral edge portion of the subplate is made variable within the width of the bead formed in the base plate thereby varying the width of each peripheral edge portion, and a linear bead that can be contained within a linear bead of the base plate is formed only in the continuous portion of the subplate.

In accordance with a second aspect of the present invention, there is provided the metallic gasket described above characterized wherein the bead width at the peripheral edge of the cylinder bore hole formed in each of the two base plates is varied.

In accordance with a third aspect of the present invention, there is provided the metallic gasket described above characterized wherein the bead formed between the cylinder bore holes in the subplate is formed such that the protruding amount on the convex side is made smaller than the concave depth on the concaved inside of the bead formed between the cylinder bore holes in the base plate to which the subplate is secured.

The basis of the metallic gasket structure of the invention wherein two pieces of base plates each having two or more cylinder bore holes are placed one upon another and are interposed therebetween by a thin subplate formed with two or more cylinder bore holes is that a bead is formed on each base plate protruding outward from each outside surface of each base plate at the outer circumference of the flat portions defining the cylinder bore hole thereinside like the prior art, and a linear bead joining the beads for both of the adjacent cylinder bore holes and extending perpendicularly to a line connecting the centers of the cylinder bore holes is formed between both of the cylinder bore holes also like the prior art.

Thus, by the aforementioned structure, when the metallic gasket is disposed between the cylinder block and the cylinder head and when the cylinder block and the cylinder head are tightened by means of a clamping mechanism, such as bolts, the surface pressure around the cylinder bores of an engine can be improved.

On the other hand, the subplate comprises an essentially circular circumferential edge portion present only at the periphery of the cylinder bore holes and a continuous portion for making a portion continuous between the adjacent cylinder bore holes. Then, the subplate is secured over the entire circumference to the flat area of the base plate on the side near the cylinder bore hole, with the inner circumferential edge of the cylinder bore hole in one of the base plates being aligned with the circumferential edge of the cylinder bore hole in the subplate. In a metallic gasket in which the base plates are stacked and the subplate is also laminated, the circumferential edge portion of the subplate is present at the flat area round the cylinder bore hole and the rear face of the bead, that is, the inside of the base plate, and the continuous portion of the subplate is present also at the rear face, that is, the inside of the linear bead of the base plate between the cylinder bore holes.

Then, the outer circumferential end at the circumferential edge portion of the subplate is varied within the width of the bead around the cylinder bore hole of the base plate. The increase of the tightening force increases or decreases the number of hills of the bead corresponding to the subplate. As the number of hills of the bead increases, the reaction force of the bead is increased proportional to the number of hills of the bead corresponding to the subplate, that is, as the width of the subplate is greater, whereas the reaction force of the bead is reduced as the number of hills of the bead corresponding to the subplate is lessened, that is, the width of the subplate is narrower. Accordingly, it is possible to average the generated surface pressure around the cylinder bore to engine parts, by making the width of the subplate greater at a portion remote from the clamping means, such as bolts, and in which the tightening force is smaller and by narrowing the width of the subplate at a portion near the clamping means, such as bolts, in which the tightening force is greater.

In this embodiment since the metallic gasket has such a constitution that the width of the bead disposed along the circumferential edge portion of the cylinder bore hole in the base plate is varied, the reaction force can be increased in the portion remote from the clamping means, such as bolts, in which the tightening force is smaller, by narrowing the width of the bead and thereby increasing the buckling strength, whereas the reaction force can be reduced in the portion near the clamping means, such as bolts, in which the tightening force is greater by narrowing the width of the beads and thereby reducing the buckling strength. Then the surface pressure around the bore holes can be equalized by using the bore holes and the subplate width for control.

In addition, since a linear bead of the subplate that can be contained in a linear bead of the base plate is formed to a continuous portion making the circumferential edges of adjacent cylinder bore holes continuous, even if the connection portion is secured to the flat portion of the adjacent cylinder bore holes, it is free from excessive increase of the reaction force in that portion of the metallic gasket caused by excessive increase of the force that controls the deformation of the bead in the base plate, or from impairing the circularity for the cylinder bore.

In another embodiment of the metallic gasket, the protruding amount on the protrusion outside of the linear bead formed between the cylinder bore holes in the subplate is made smaller than the concave depth of the hollow inside of the linear bead formed between the cylinder bore holes in the secured base plate to which the subplate is secured, by which it is possible to control the gap formed between both of the beads, thereby regulating the force that the linear bead of the subplate exerts to deform the linear bead of the base plate. Accordingly, it is possible to control the necessary reaction force between the cylinder bores in which the tightening force by clamping means that distorts the bead plate is controlled by the subplate bead so that the surface pressure around the cylinder bore can be equalized by a suitable combination of the factors as described above.

BRIEF DESCRIPTION OF THE DRAWINGS

FIGS. 1(a), (b), and (c) show a preferred embodiment of a metallic gasket according to the present invention in which FIG. 1(a) is a plan view of a lower base plate and a subplate secured thereto.

DETAILED DESCRIPTION OF THE PREFERRED EMBODIMENTS

Figure 1A:
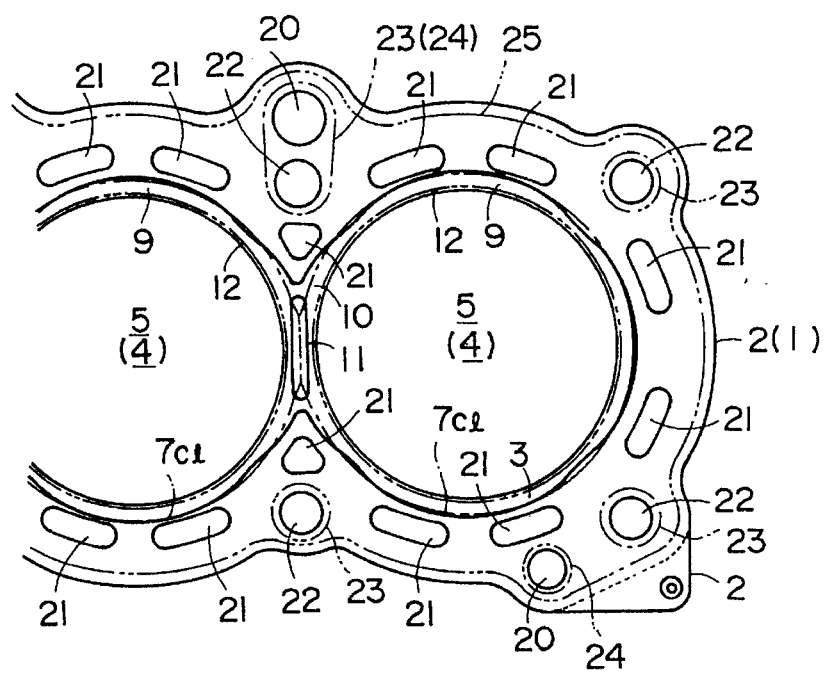
Figure 1B:
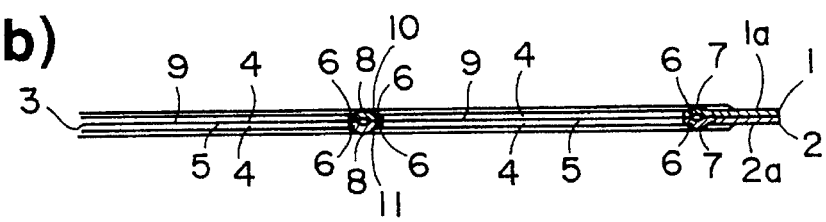
FIG. 1(b) is a central longitudinal cross sectional view thereof.
Figure 1C:
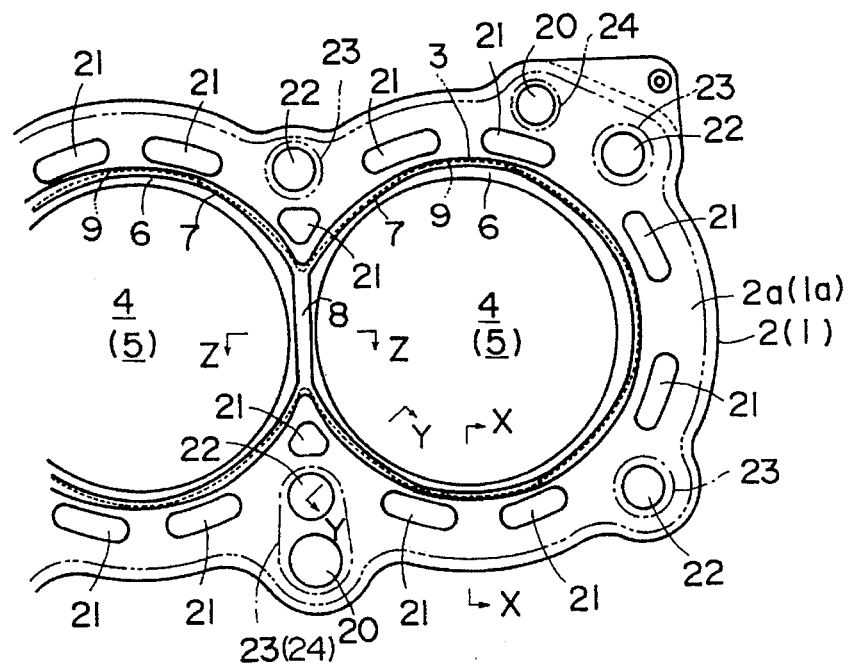
FIG. 1(c) is a bottom view thereof.

FIGS. 1(a), 1(b) and 1(c) show a preferred embodiment of a metallic gasket according to the present invention. In this embodiment, the metal gasket is formed in laminated structure in which two elastic base plates 1 and 2 made of metal are stacked and a subplate 3 is secured to the lower subplate 2 and interposed between the base plates 1 and 2.

In the base plates 1 and 2 and the subplate 3, two or more cylinder bore holes 4 and 5 are formed respectively that penetrate the base plates 1 and 2 and the subplate 3 and coincide with each other when they are laminated together as a metallic gasket. The cylinder bore holes 4 and 5 are disposed at such positions that they communicate with the cylinder bores of an engine when the engine is constituted by disposing the metallic gasket between a cylinder block and a cylinder head. Accordingly, oil holes 20 formed in the base plates 1 and 2 are in communication with an oil gallery formed in the engine, water holes 21 formed in the base plates 1 and 2 are in communication with a water jacket formed on the engine, and bolt holes 22 formed in the base plates 1 and 2 are disposed at such positions to communicate with bolt holes formed in the engine.

The two base plates 1 and 2 are made symmetrical with each other. In FIGS. 1(a) and 1(c), there are shown a bolt hole bead line 23 formed at the periphery of the bolt hole 22 to represent the center line for the bolt hole bead, an oil hole bead line 24 formed at the periphery of the oil hole 20 to represent the center line of the oil hole bead and an outer edge bead line 25 formed along the outer edge of the base plate to represent the center line for the outer edge bead, respectively.

Further, an essentially circular bore hole bead 7 is formed at the periphery of each of the cylinder bore holes 4 of the base plates 1 and 2 by way of and along the outer circumference of a flat area 6 which is flat like other portions thereof. As shown in FIG. 1b, the bore hole bead 7 is a stripe-like curved ridge which protrudes outwardly from each of the outer sides 1a and 2a of the base plates 1 and 2 and it is shaped mainly by pressing or the like and has a concave groove at the inside thereof.

In FIG. 1a, single dot chain lines 7cl denotes center lines for bore hole beads 7. Both of the bore hole beads 7 are joined together at a portion between adjacent cylinder bore holes 4 into a linear bore hole bead 8 that extends perpendicularly to a line connecting centers for both of the adjacent cylinder bore holes 4 as shown in FIG. 1c. This is so made because the space between the cylinder bores is narrowed due to engine size reduction and the increased diameter of the cylinder bore as described above. When the flat area 6 is formed at the periphery of the cylinder bore hole 4 for adjusting and compensating the positional deviation caused by punching press work, as described above, and the bore hole bead 7 is formed on the outer circumference thereof, the bore hole bead lines 7cl overlap at a portion between the cylinder bore holes 4 as shown in FIG. 1a. Accordingly, the linear bore hole bead 8 composed of both of the beads 7 joined to each other is formed in the overlapped portions. In other words, the bore hole beads 7 between the cylinder bore holes 4 are made linear since the adjacent bore hole beads 7 are joined/branched between the cylinder bore holes 4.

The width of the bore hole beads 7 and 8 is varied except for the linear bore hole bead 8 between the cylinder bore holes 4. Specifically, the width of the bore hole bead 7 is made greater at a portion near the bolt hole 22, whereas the width of the bore hole bead 7 is made smaller at a portion apart therefrom, that is, at a portion between the bolt holes 22. This width variation is for changing and controlling the reaction force in the portions by changing the buckling strength caused by the width variation for the bore hole bead 7 and the function and the effect thereof will be described below in more detail.

On the other hand, the subplate 3 has an essentially circular circumferential edge portion 9 formed only at the periphery of each of the cylindrical bore holes 5 and a continuous portion 10 for making a portion of the subplate 3 continuous at a portion between adjacent cylinder bore holes 5. The subplate 3 is made of a metallic plate having a thickness less than that of each of the base plates 1 and 2 and it is formed by a punching press or the like from a flat plate of a uniform thickness in this embodiment. Subplate 3 is provided to reduce the gap between the joining faces of the cylinder block and the cylinder head as engine parts and the base plates 1 and 2, or between the base plates 1 and 2 to each other as a result of the deformation of the engine parts caused by the bore hole bead 7 (that is, as a result of such deformation that portions of the engine parts near the cylinder bore are separated from each other), to thereby reduce the vibration amplitude in the flat area 6 and the bore hole bead 7 and to suppress the fatigue failure thereof. It also provides surface pressure at the periphery of the cylinder bore of the engine as a wedge interposed between both of the base plates 1 and 2.

Accordingly, the subplate 3 is secured over the entire circumference at the periphery of the cylinder bore hole 4 by beam welding or the like in the flat area 6 on the side near the cylinder bore hole 4, with the inner circumferential edge of the cylinder bore hole 5 thereof being aligned with the inner circumferential edge of the cylinder bore hole 4 of the lower base plate 2. The securing line is shown by a double dot chain line 12 in FIG. 1a.

Accordingly, both lateral ends of the continuous portion 10 in the subplate 2, formed between the adjacent cylinder bore holes 5, are secured to a portion of the flat area 6 in the lower base plate 2 near the bore hole 4. When the linear bore hole bead 8 formed between the adjacent cylinder bore holes 4 in the base plates 1 and 2 is tightened between the cylinder block and the cylinder head and if the continuous portion 10 is flat, it will have a major effect on the accompanying buckling deformation of the linear bore hole bead 8. That is, when the linear bore hole bead 8 of the base plates 1 and 2 undergoes buckling, elongation is caused between the flat areas 6 to which the subplate 3 is secured and the elongation results as a stress to the material as pure tension to the continuous portion 10 of the subplate 3. Since the tensile force of the subplate 3 is, of course, greater than the stress, a large restraining force is created against the deformation that causes buckling of the linear bore hole bead 8, that is, the tightening force.

Since this causes a huge increase in the reaction force between the cylinder bore holes 4 and the metallic gasket and exerts a large deforming force between the cylinder bores of the engine parts, that is, the cylinder block and the cylinder head, the circularity of the cylinder bore is degraded. As a countermeasure, in the present invention, a linear bead 11 that can be contained within the linear bore hole bead 8 of the lower base plate 2 is also formed on the subplate 3, so that a force restraining the deformation of the linear bore hole bead 8 in the lower base plate 2 can be regulated. As detailed later, elongation caused by flattening the linear bore hole bead 8 of the lower base plate 2 is compensated by the elongation of the linear bead 11 of the subplate 3, by which the force to restrain the deforming force, that is, the reaction force is reduced, as well as the amount of elongation, that is, the height of both beads 8 and 11 is varied thereby enabling control of the reduction of the reaction force.

On the other hand, the outer circumferential end at the circumferential edge portion 9 of the subplate 3 is placed within the width of the bore hole bead 7 in the base plates 1 and 2, and the outer circumferential end position is further varied within the width of the bore hole bead 7 and the width varied within the circumferential edge portion 9 of the subplate 2. As will be described below in detail when a tightening force compresses the convex portion of the ridge-like bore hole bead 7, buckling will be caused in the bore hole bead 7 at a mid portion thereof in which the number of ridges is increased to two, four, etc. The engine parts surface pressure is greater at a portion in contact with a large number of crests, whereas it decreases in the valleys therebetween. As described above, if the position of the outer circumference of the subplate 3 is varied within the width of the bore hole bead 7 and the width of the circumferential edge portion 9 of subplate 3 is changed, the number of ridges of the bore hole bead 7 in the base plate increases with the tightening force, and the number of ridges of the base plate across the subplate 3 also changes. Then, since the ridges across the subplate 3 undergo deformation restriction, that is, undergo a relatively large tightening force, the reaction force formed as a reaction is naturally increased. Accordingly, since the width variation of subplate 3 changes the reaction force the surface pressure around the cylinder bore of the engine parts can be changed and controlled.

Description will now be given of the operation based on the fundamental principle according to the present invention as described above with reference to cross sectional view showing details for each of the section in this embodiment in which such techniques are suitably combined and used.

Description will be given first in the vicinity of a bolt hole 22 of the metallic gasket, that is, for the cross section taken along line Y—Y in FIG. 1(*c*), with reference to FIGS. 2 and 3, and FIGS. 4(*a*)–4(*d*) and 5(*a*)–5(*d*).

Figure 2:
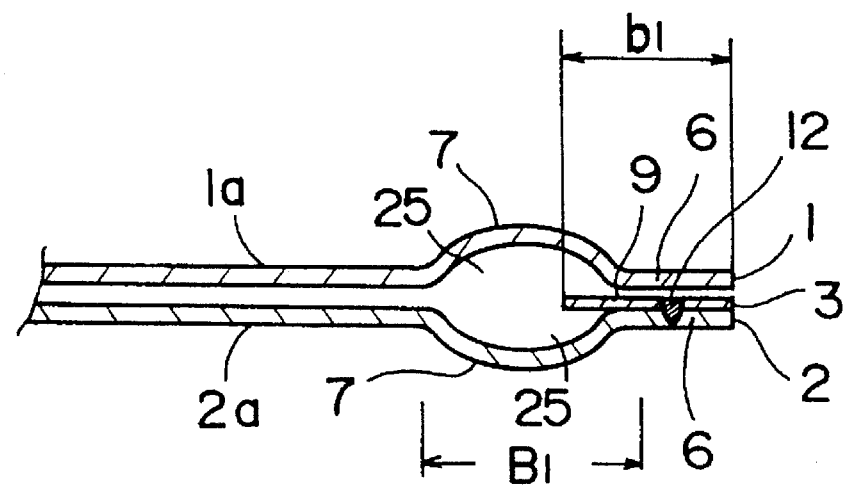
FIG. 2 is a cross sectional view taken along line Y—Y in FIG. 1(c)

As has been described above, the circumferential edge portion 9 of the subplate 3 is secured over the entire circumference thereof along the securing line 12 at a position of the flat area 6 of the base plate 2 near the cylinder bore hole 4, with the inner circumferential edge of the cylinder bore hole 5 in the subplate 3 being aligned with the inner circumferential edge of the cylinder bore hole 4 in the lower base plate 2 as shown in detail in FIG. 2.

On the other hand, the outer circumferential end at the circumferential edge portion 9 of the subplate 3 is free within a concavity 25 of the bore hole bead 7 in the stacked base plates 1 and 2, and the position of the outer circumferential end is varied within the width of the bore hole bead 7 thereby providing variation in the width of the circumferential edge portion 9 of subplate 3. In this variation, the width of the circumferential edge portion 9 of the subplate 3 is relatively narrow near the bolt hole 22 of the gasket. On the contrary, FIG. 3 shows a circumferential edge portion 9 of the subplate 3 having a relatively large width. For the convenience of explanation, it is assumed that the width of the bore hole bead 7 is constant as $B_1$, the width of the narrow subplate 3 shown in FIG. 2 is $b_1$, and the width of the broad subplate 3 is $b_0$.

Figure 4A:
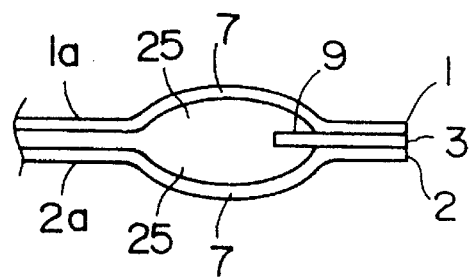
FIGS. 4(a)–4(d) illustrate a state where a tightening force is increased in FIG. 2.
Figure 4B:
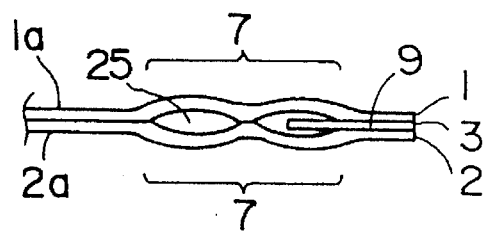
Figure 4C:
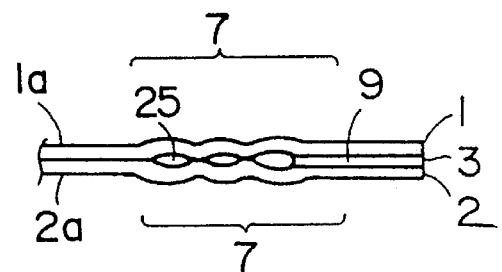
Figure 4D:
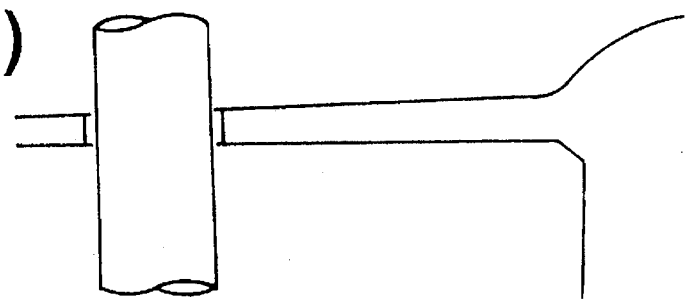
Figure 5A:
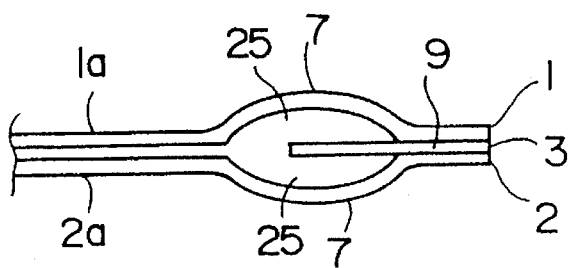
FIGS. 5(a)–5(d) illustrate a state where a tightening force is increased in FIG. 3.
Figure 5B:
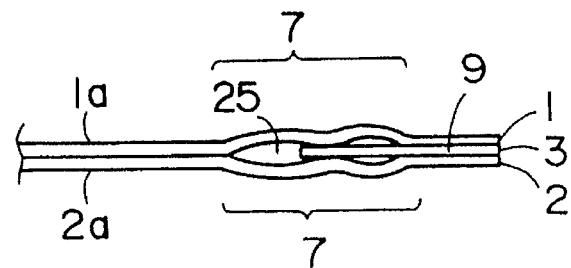
Figure 5C:
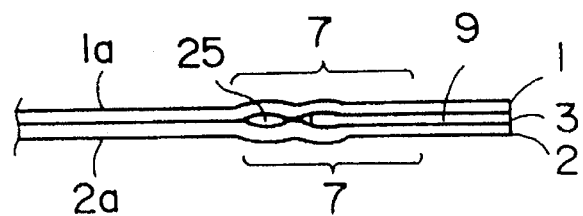
Figure 5D:
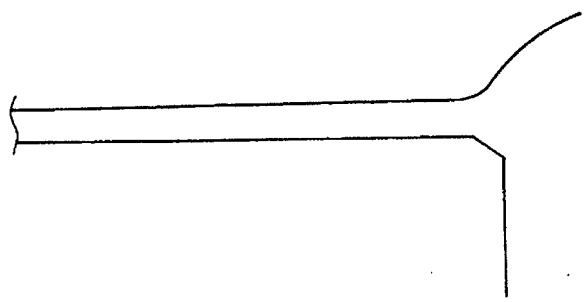

At first, explanation will be made with reference to FIGS. 4(*a*)–4(*d*) to a state in which a metallic gasket having a subplate 3 of narrow width shown in FIG. 2 interposed between the base plates 1 and 2 is sandwiched by engine parts, such as a cylinder block and a cylinder head, and a tightening force is exerted on the bore hole bead 7 thereof. As shown in FIG. 4*a*, when a tightening force is exerted on the crest of the ridge-like bore hole beads 7 formed in the base plates 1 and 2, a mid portion of the ridge buckles into a concave shape and, the number of ridges for the bore hole bead 7 increases from one into two as shown in FIG. 4*b*. As the tightening force is further exerted, the number of ridges of the bore hole bead 7 is gradually multiplied to four, eight, etc. as shown in FIG. 4*c*. The height and the width of the ridges, of course, decrease with the increase in the number of ridges. In this case, if the subplate 3 is not present, the surface pressure is greater at a contact point of the deformed and increased crest of the ridges of the bore hole bead 7 and the contact surface of each of the engine parts, and the surface pressure is gradually reduced toward the valley adjacent thereto.

By the way, when the subplate 3 is interposed between the bore hole bead 7 in the two base plates 1 and 2, the ridges riding on the subplate 3, among the increasing ridges of the bore bead 7, are regulated in distortion as shown in FIG. 4*c* and, in regards to the still increasing tightening force, a greater reaction force than that in other portions of the bead 7 is created to increase the surface pressure. Then, local stress concentration occurs at a portion of the bore hole bead 7 of the base plates 1 and 2 corresponding to the outer circumferential end of the subplate 3, to result in a local surface pressure increase in that portion. The deformation of the engine parts in this case increases locally at the portion where the subplate 3 exists, but an inclination angle as a whole (tendency of deformation assuming the engine part as an elastic member having rigidity to some extent) is made small. The local deformation of the engine in this case is within a so-called elastic deformation range, and will not form an indentation.

Figure 3:
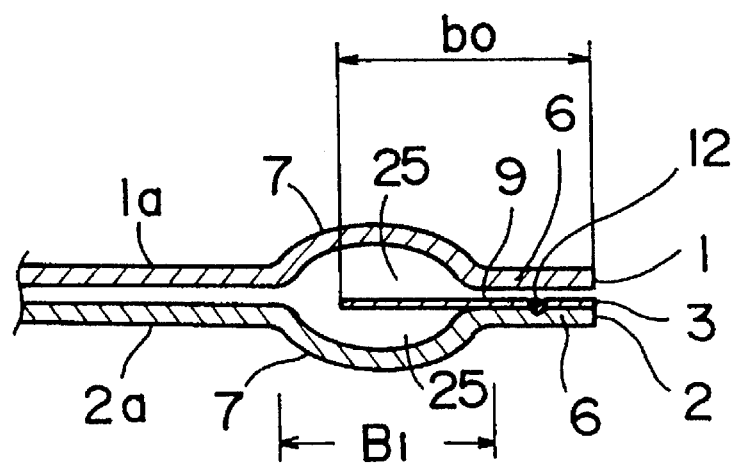
FIG. 3 is a cross sectional view with a broad width subplate of FIG. 2.

This will be verified with a metallic gasket having a wide subplate 3 interposed between the base plates 1 and 2 as shown in FIG. 3. Different from the case shown in FIGS. 4(*a*)–4(*d*), among the number of ridges which increase along with the deformation of the bore hole bead 7, the number of ridges riding on the subplate 3 is increased as shown in FIGS. 5(*b*) and 5(*c*) and the entire surface pressure is also increased. Further, assuming that an identical tightening force with that in FIGS. 4(*a*)–4(*d*) exists, since a further greater local stress concentration occurs at a portion of the bore hole bead 7 of the base plates 1 and 2 corresponding to the outer circumferential edge of the subplate 3, the local surface pressure in this portion is drastically increased. Further, the engine parts deformation in this case will increase the entire inclination angle.

Taking the foregoing situations into consideration together, there is a general trend that the tightening force is larger near the bolt hole and the tightening force is smaller between the bolt holes in accordance with the elastic deformation of the engine parts, and such a trend becomes particularly conspicuous recently in which the rigidity of engine parts is gradually reduced due to the trend of using aluminum material for the engine parts and enlarging water channels. Accordingly, the outer circumferential end of the circumferential edge portion 9 of the subplate 3 is varied within the width of the bore hole bead 7 so as to narrow the width of the subplate 3 for a portion near the bolt hole 22 where the tightening force is large, whereas the outer circumferential end of the circumferential edge portion 9 of the subplate 3 is varied within the width of the bore hole bead 7 so as to increase the width of the subplate 3 for a portion between the bolt holes 22 where the tightening force is smaller, by which the surface pressure generated around the cylinder bores of the engine parts can be made uniform.

Figure 6:
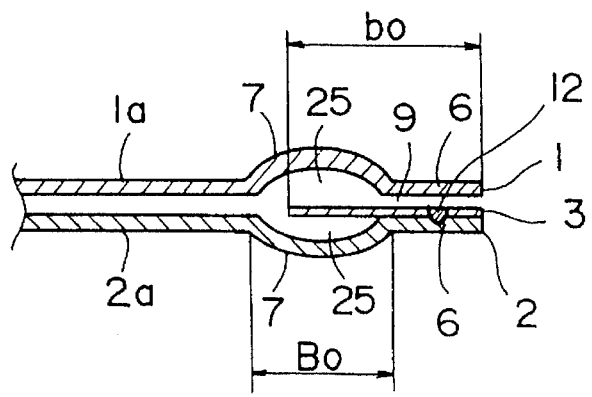
FIG. 6 is a cross sectional view taken along line X—X in FIG. 1(c)

Explanation will be given with reference to FIG. 6 to a portion between bolt holes 22 of the metallic gasket, that is, a cross sectional view taking along line X—X in FIG. 1(c). In the portion between the bolt holes 22, the width $B_0$ of the bore hole bead 7 in the base plates 1 and 2 is made narrower than the width $B_1$ of the bore hole bead 7 near the bolt hole 22 shown in FIG. 2.

As has been described above, the bore hole bead 7 of the base plates 1 and 2 undergoes buckling deformation such that the number of ridges of the bead is increased by the tightening force of the engine parts. Since the buckling deformation develops within an elastic limit, the buckling strength of the bore hole bead 7 can also be referred to as a spring constant of the bead. In this case, if the width of the bore hole bead 7 is narrowed, the buckling strength of the bead is increased under the effect of fabrication hardening or the like, which naturally increases the spring constant of the bead and, accordingly, the reaction force is greater in the bore hole bead 7 of narrow width than that in the bore hole bead 7 of larger width if the tightening force is constant. Furthermore, in the portion of the metallic gasket between the bolt holes 22, since the subplate 3 shown in FIG. 3 of the width $b_0$ greater than the narrow width $b_1$ of the subplate 3 shown in FIG. 2 is interposed therein, the entire reaction force is considerably increased under the condition of constant tightening force.

Figure 7A:
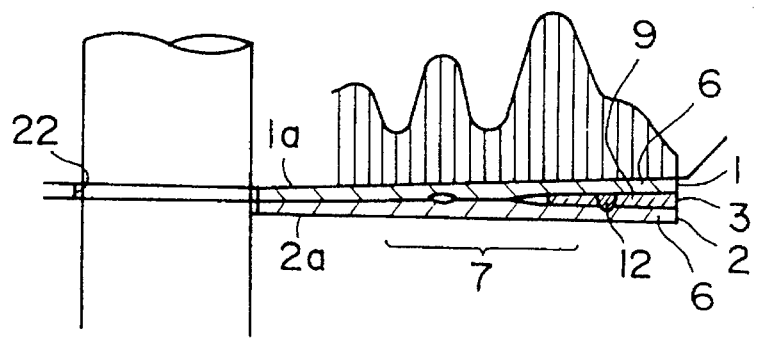
FIGS. 7(a)–7(b) illustrate the distribution of the surface pressure in FIG. 2.
Figure 7B:
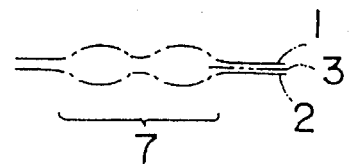
Figure 8:
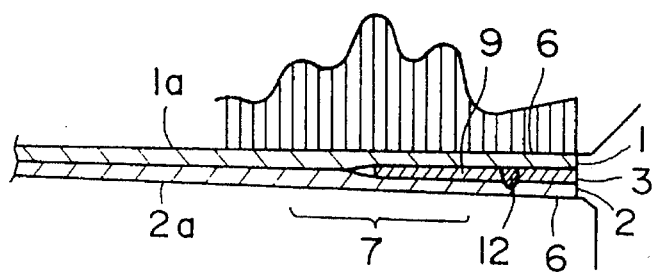
FIGS. 8(a) and 8(b) illustrate the distribution of the surface pressure in FIG. 6.
Figure 8:
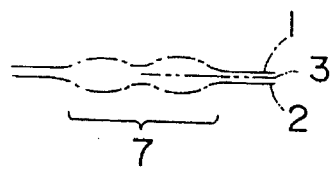
Figure 9:
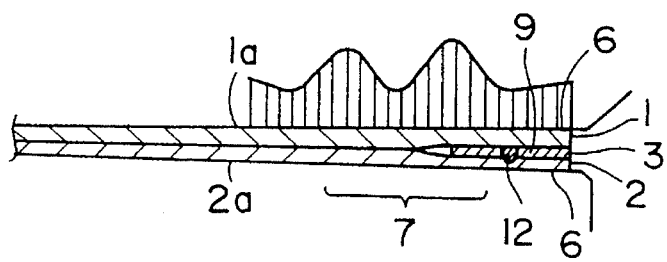
FIGS. 9(a) and 9(b) illustrate the distribution of the surface pressure in FIG. 8 with a subplate of narrow width.
Figure 9:

FIGS. 7(a), 7(b), 8(a), 8(b), 9(a) and 9(b) show the state of distribution of the surface pressure in the metallic gasket of this embodiment in which the combined techniques described previously are used. FIG. 7a shows a surface pressure distribution in a cylinder head near the bolt hole 22 along the diametrical direction of the cylinder bore, FIG. 8a shows a surface pressure distribution in the cylinder head between the bolt holes 22 along the diametrical direction of the cylinder bore and further, and FIG. 9a shows a surface pressure distribution in a cylinder head between the bore holes 22 along the diametrical direction of the cylinder bore, similar to a case of using a narrow subplate 3 like that in FIG. 7. Each of the FIGS. 7(b), 8(b) and 9(b) shows the state of the bore hole bead 7 and the subplate 3 in the base plate.

As it is obvious from the Figures, since the tightening force is greater near the bolt hole 22, the surface pressure generated at the circumferential end of the circumferential edge portion 9 of the subplate 3 is naturally high; but the engine parts deformation, that is, the inclination angle toward the cylinder bore, is small. On the other hand, the engine parts deformation, that is, the inclination angle to the cylinder bore is large between the bolt holes 22, with all of the small tightening force and, as a result, a large surface pressure equal with that near the bolt hole 22 is generated at the outer circumferential end of the circumferential edge portion 9 of the subplate 3. On the contrary, when the narrow subplate 3 is interposed between the bolt holes 22, the surface pressure also generated at the outer circumferential end of the circumferential edge portion 9 of the subplate 3 is low and it is predicted that the surface pressure around the cylinder bore will vary to degrade the cylinder bore circularity.

Figure 10:
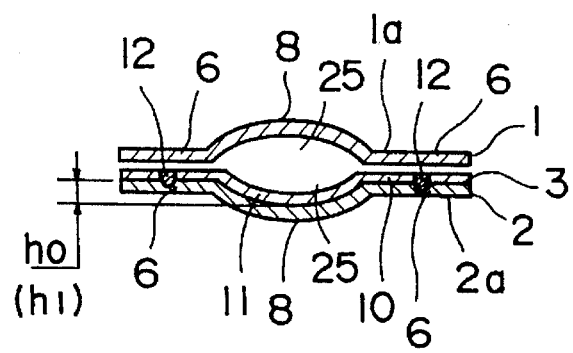
FIG. 10 is a cross sectional view taken along line Z—Z in FIG. 1(c)

Explanation will now be given with reference to FIGS. 10 and 11 to a portion between cylinder bore holes 4 of the metallic gasket,, that is, a cross sectional view taken along line Z—Z in FIG. 1(c).

Between the cylinder bore holes 4 and 5, a linear bead 11 that can be contained within a linear bore hole bead 8 formed to a lower base plate 2 is also formed in a subplate 3 as described above. It is defined in FIG. 11 that the concave amount (depth) in the hollow inside of the linear bore hole bead 8 in the lower base plate 2 is $h_0$ and the protrusive amount on the protrusive outer side of the bead 11 in the subplate 3 is $h_1$, respectively. Then, in the continuous portion 10 of the subplate 3, both lateral ends near the adjacent cylinder bore holes 5 are secured over a securing line 12 to a flat area 6 of the adjacent cylinder bore holes 4 in the lower base plate 2. Accordingly, in a case where the concave amount $h_0$ for the hollow inside of the linear bore hole bead 7 in the base plate 2 is equal with the protrusive amount $h_1$ at the protrusive outside of the bead 11 in the subplate 3, that is, the protrusive outside of the bead 11 in the subplate 3 is in contact with the inner side of the concave portion 25 of the linear bore hole bead 8 in the base plate 2 as shown in FIG. 10. The sum of the reaction force in accordance with the buckling strength of the linear bore hole bead 8 in the lower base plate 2 and the reaction force in accordance with the buckling strength of the bead 11 in the subplate 3 is exerted as a reaction force of the lower base plate 2 of the metallic gasket between the cylinder bore holes 4 to the tightening force exerted from the outer sides 1a and 2a of base plates 1 and 2.

In this case, the reaction force in accordance with the buckling strength of the bore hole bead 8 in the base plate 2 and the reaction force in accordance with the buckling strength of the bead 11 in the subplate 3 are defined independently because the effects such as of fabrication hardening is different due to the difference between the material constituting the base plate 2 and the material constituting subplate 3, and the difference in the amount of embossing. Further, since there must be a delicate difference for the amount of elongation accompanying the buckling deformation between the base plate 2 and the subplate 3, the overall reaction force does not occur, strictly, just per the theory since other factors may also be present.

Figure 11:
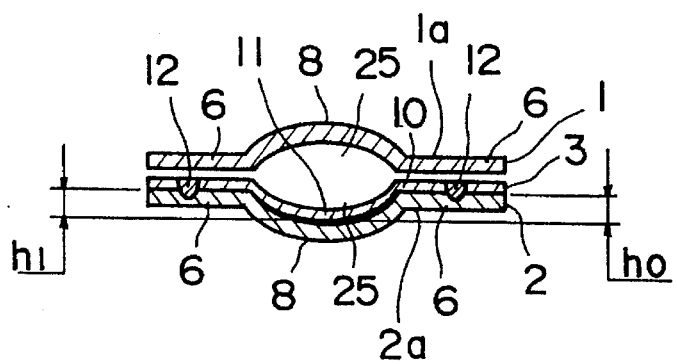
FIG. 11 illustrates a state where a gap is provided between the bead of a base plate and the bead of a subplate in FIG. 10.
Figure 12:
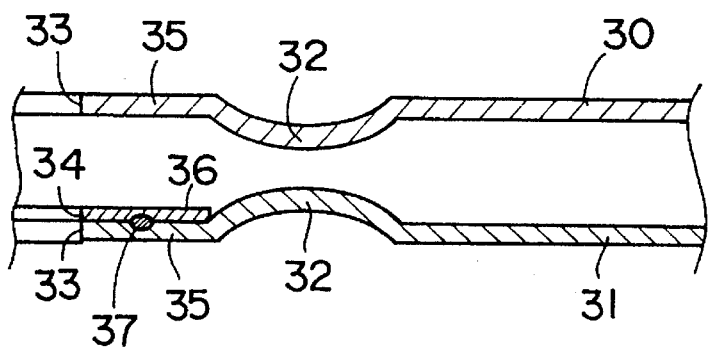
FIG. 12 is a longitudinal cross sectional view of one embodiment of a metallic gasket in the prior art.

By the way, in a case where the protrusive amount $h_1$ for the protrusive outside of the bead 11 in subplate 3 is smaller than the concave amount $h_0$ at the hollow inside of the linear bore hole bead 8 in the lower base plate 2, that is, if there is a gap between the interior concavity 25 of the linear bore hole bead 8 in the base plate 2 and the protrusive outer side of the bead 11 in the subplate 3, as shown in FIG. 11, the length to the securing line 12 in the flat area of the adjacent cylinder bore hole 4 is longer in base plate 2 than in subplate 3. When a tightening force is exerted from the cylinder block or the cylinder head in contact with the crest on the outer side of the linear bore hole bead 8 in such a base plate 2, a mid portion of the bore hole bead 8 in the base plate 2 undergoes buckling into a concave shape in which the concave mid portion of the bore hole bead 8 in the base plate 2 forces the crest of bead 11 in subplate 3, so that a mid portion of bead 11 in subplate 3 undergoes buckling to also deform bead 11 in subplate 3 into a concave shape.

By repeating such deformation successively, the beads for the base plate and the subplate 3 undergo buckling such that the number of the edges increases from one to two, four, etc. Then, bead 11 in the subplate 3 is completely buckled. Since the securing line 12 length in flat area 6 of adjacent cylinder bore hole 4 is longer in base plate 2 than in subplate 3, the bore bead 8 in the base plate 2 is not yet completely buckled. The linear bore hole bead 8 of bottom base plate 2 undergoes more buckling under the tightening force, and the subplate 3 material distorts to react and is forced to stretch in pure tension as affected by the tensile stress. However, since the tensile pulling force of the subplate 3 is greater than the buckling strength of the bore hole bead 8 in the base plate 2, the tightening force which effects the bore hole bead 8 of bore plate 2 has an influence on the large reaction force which suppresses the distortion of bead 8. This increases the surface pressure generated between the cylinder bores of engine parts, such as the cylinder block or the cylinder head, by way of the bore hole bead 8 in the base plate 2.

In other words, the reaction force of the metallic gasket between the cylinder bore holes 4 can be controlled by controlling the length of the subplate 3 that controls the buckling of the linear bore hole bead 8 on the base plates 1 and 2, namely, the gap between the concave amount $h_0$ on the hollow inside of the linear bore hole bead 8 in the base plate 2 and the protrusive height $h_1$ on the protrusive outside of the bead 11 in the subplate 1.

The width for the subplate and the width for the bore hole bead can be controlled by actually measuring the gap around the assembled cylinder bore and controlling the same therewith. However they may be controlled by the previously determined state of the stress distribution in engine parts by a so-called finite element method (FEM) and according to an equation based on the stress distribution to obtain an uniform surface pressure corresponding to the tightening force.

As has been described above, the metallic gasket of the present invention can equalize the surface pressure at least around the cylinder bore to thereby improve the seal, as well as to ensure the circularity of the cylinder bores, so as to thereby contribute to the improvement of engine performance.

What is claimed is:

1. A metallic gasket having a laminate structure formed of two elastic base plates made of a metal material and stacked to each other and a subplate having a thickness thinner than that of said base plates and disposed between inner sides of said base plates, comprising:

at least two cylinder bore holes formed in each of said base plates and said subplate in the laminated state;

a bead protruding outwardly from an outer side of each of the base plates at the periphery of each cylinder bore hole in each of said base plates by way of and along the outer circumference of a flat area on said base plates;

a linear bead, which joins the beads for both of the adjacent cylinder bore holes and extends perpendicularly to a line connecting a center of both of the cylinder bore holes, formed between said adjacent cylinder bore holes in each of the base plates;

said subplate including an essentially circular circumferential edge portion present only at the periphery of each of said cylinder bore holes and a continuous part that makes a portion of said subplate continuous between adjacent cylinder bore holes;

said subplate secured over the entire circumference to the inner side of one of said base plates at a portion of said flat area of said base plate adjacent the cylinder bore hole, with the inner circumferential edge of the cylinder bore hole of said subplate being aligned with the inner circumferential edge of the cylinder bore hole of said base plate;

the outer circumferential end at the peripheral edge portion of said subplate being varied within the width of the bead formed in said base plate to provide a variation to the width of each peripheral edge portion; and a linear bead contained within the linear bead of said base plate and formed only in the continuous part of said subplate;

wherein the bead formed between the cylinder bore holes in said subplate is such that a protrusive amount on a protruding outside is made smaller than a concave depth of a concave inside of the bead formed between the cylinder bore holes in the base plate to which the subplate is secured.

\* \* \* \* \*